Oct. 30, 1956     A. C. DRAPER ET AL     2,768,387
SINK APPLIANCE FOR GARBAGE DISPOSER
Filed Dec. 4, 1953     3 Sheets-Sheet 1
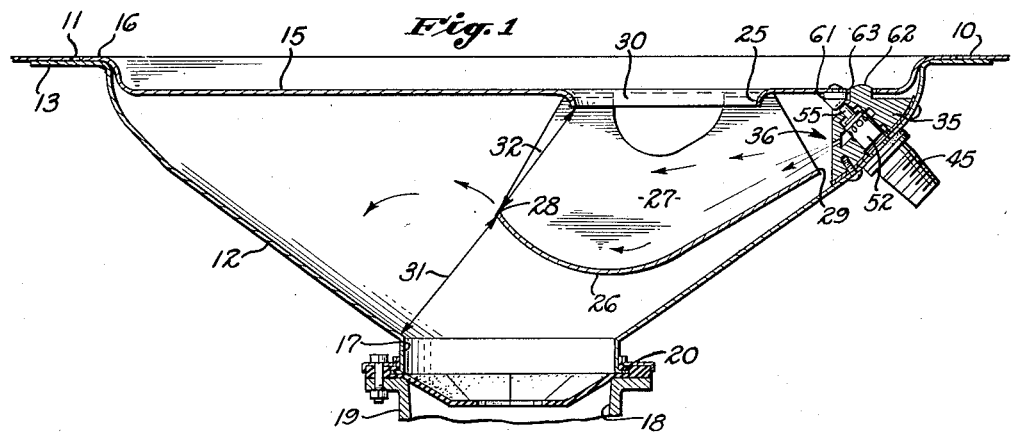
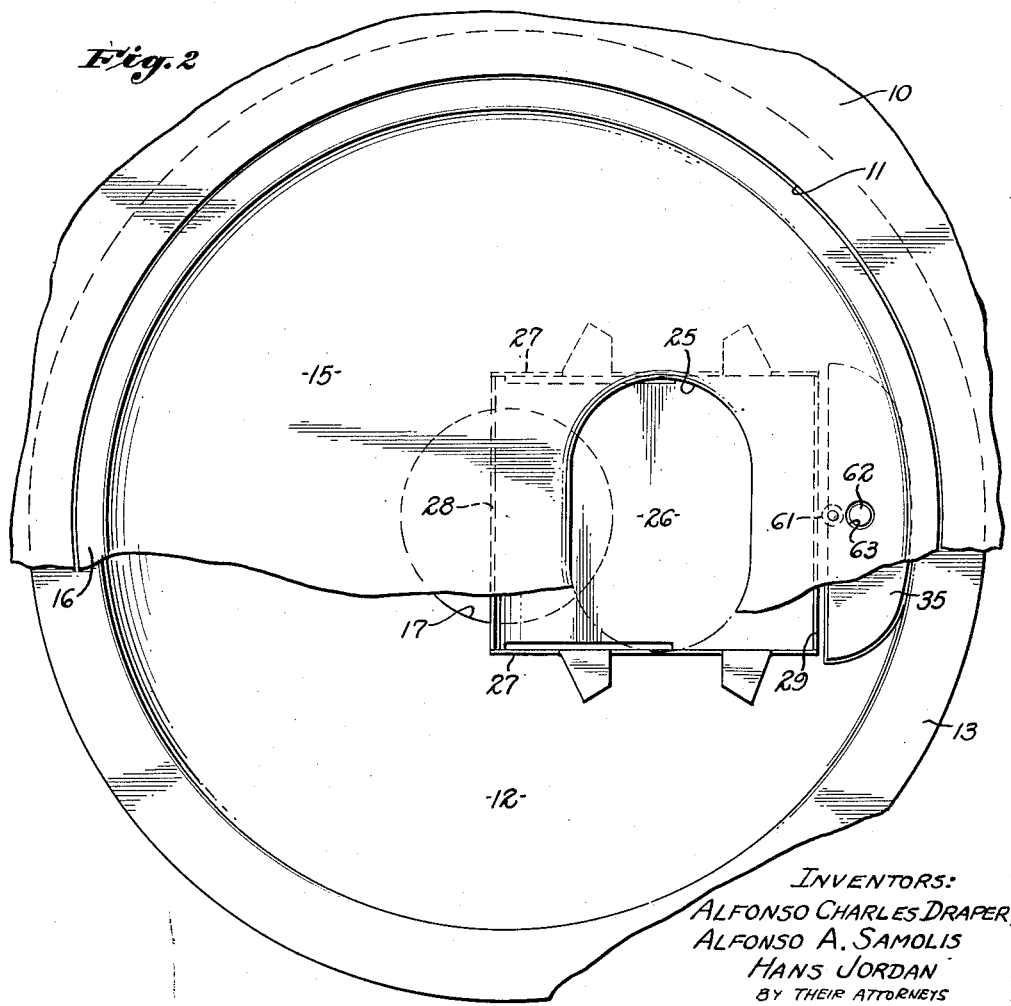
INVENTORS:
ALFONSO CHARLES DRAPER
ALFONSO A. SAMOLIS
HANS JORDAN
BY THEIR ATTORNEYS
HARRIS, KIECH, FOSTER & HARRIS Oct. 30, 1956 A. C. DRAPER ET AL 2,768,387
SINK APPLIANCE FOR GARBAGE DISPOSER
Filed Dec. 4, 1953 3 Sheets-Sheet 2
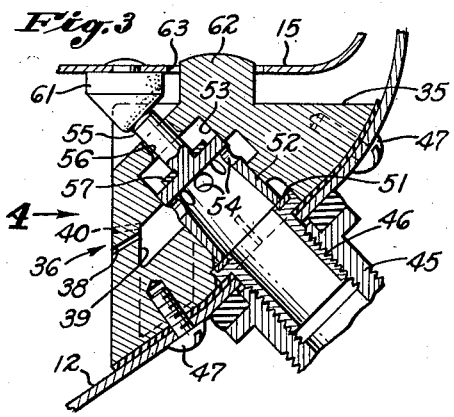
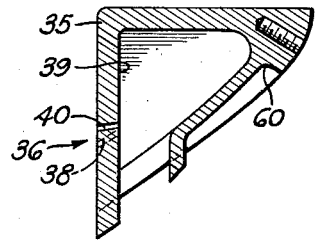
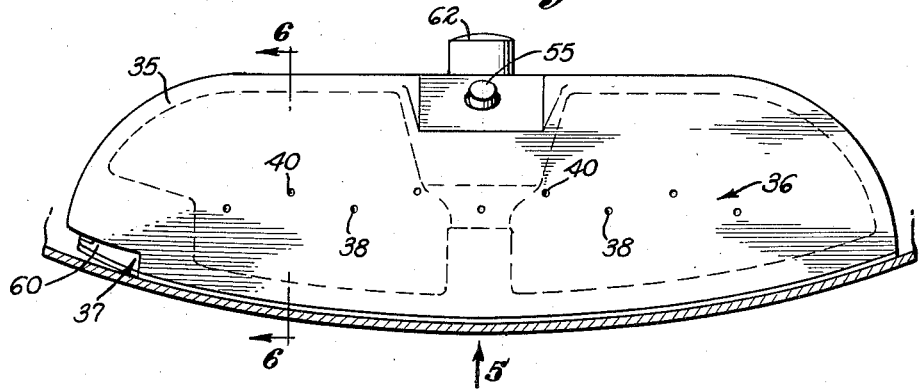
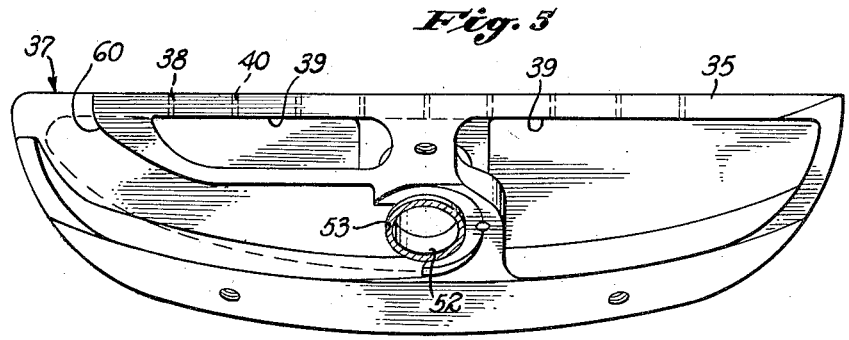
INVENTORS:
ALFONSO CHARLES DRAPER
ALFONSO A. SAMOLIS
HANS JORDAN
BY THEIR ATTORNEYS
HARRIS, KIECH, FOSTER & HARRIS

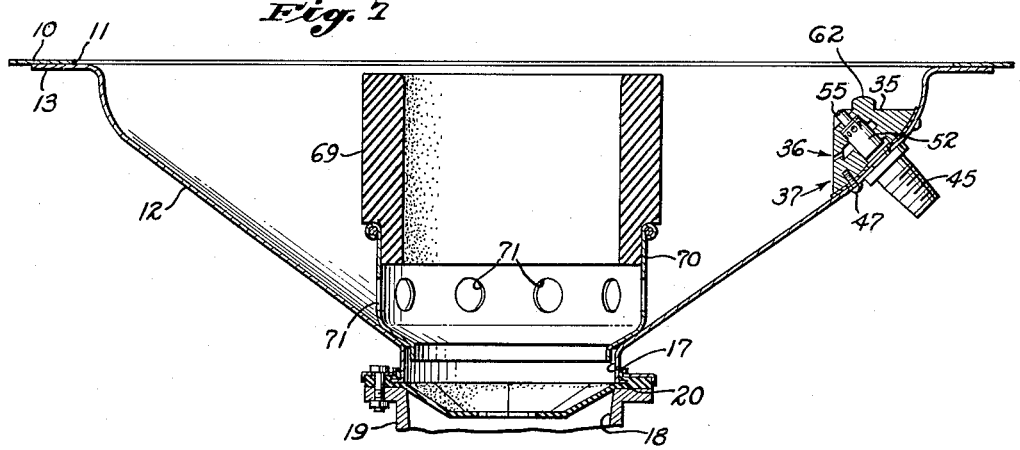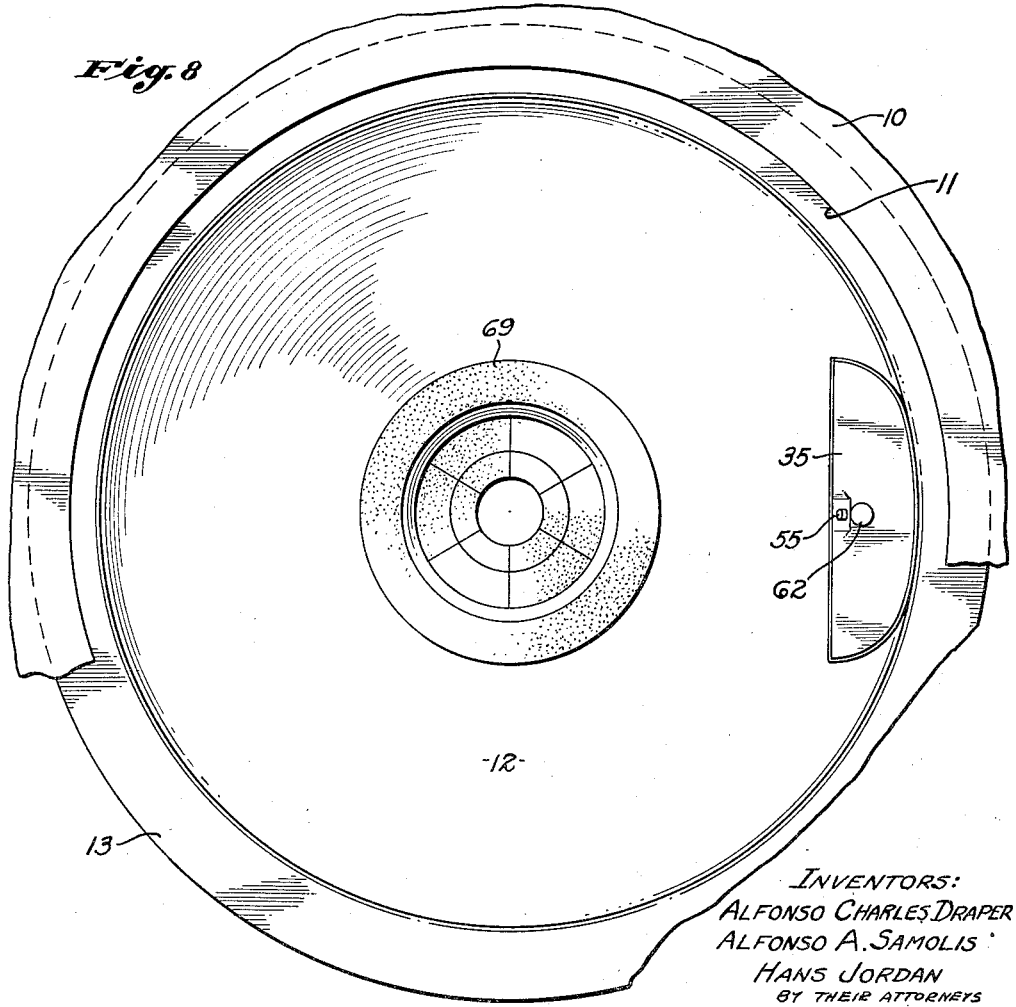

United States Patent Office 2,768,387
Patented Oct. 30, 1956

2,768,387

SINK APPLIANCE FOR GARBAGE DISPOSER

Alfonso Charles Draper, Alfonso A. Samolis, and Hans Jordan, Los Angeles, Calif., assignors to Given Manufacturing Co., a corporation of California Application December 4, 1953, Serial No. 396,208

26 Claims. (Cl. 4—187)

The present invention relates to a sink appliance primarily adapted for use with an apparatus such as a garbage disposer, the invention being considered herein in connection with a garbage disposer for convenience.

More particularly, the present invention includes a downwardly converging and preferably generally conical sink provided at its lower end with an outlet which communicates with the inlet of a garbage disposer so that garbage introduced into the sink is discharged into the disposer to be comminuted therein, the disposer preferably being attached to the lower end of the sink.

Provided in the sink is a tableware trapping receptacle means or basin for retaining any tableware which may inadvertently be introduced into the sink so that such tableware is not discharged from the sink into the garbage disposer. Preferably, the tableware trapping basin is carried by a cover for the sink, the cover being adapted to seat on the upper end of the sink and having an opening therethrough above and in alignment with the tableware trapping basin for the introduction of garbage into the sink. The invention also provides two water inlet means for the sink, the first being adapted to direct one or more generally horizontal jets of water at the tableware trapping basin when the cover carrying the basin is in place, such jet or jets being so directed as to hydraulically displace garbage from the tableware trapping basin over a discharge lip or edge thereof into the sink to be comminuted by the garbage disposer, without, however, displacing out of the tableware trapping basin any tableware therein. The second water inlet means, when operated, is adapted to introduce water into the sink in a generally tangential direction to produce a swirling flow of water which spirals inwardly and downwardly to the outlet at the lower end of the sink so as to flush through the outlet any garbage which may be adhering to the sides of the sink.

Considering the invention in more detail with the foregoing background in mind, a primary object of the invention is to provide a selector valve means which is movable between a first position wherein it opens the first water inlet means and closes the second water inlet means and a second position wherein it opens the second inlet means and closes the first inlet means, the selector valve means being actuable by an actuating means which is operative when the cover is in a predetermined position over the sink, although an independent actuating means, e. g., manually controlled, could be used.

More particularly, an object of the invention is to provide an actuating means carried by the cover and engageable with the selector valve means when the cover is in place on the sink for maintaining the selector valve means in its first position so as to maintain the first inlet means open and the second inlet means closed so that water is directed at the tableware trapping basin when the cover is in place, the tangentially-discharging second inlet means being inoperative under such conditions.

Another object is to provide means for biasing, and preferably hydraulically biasing, the selector valve means toward its second position so that, when the cover, and the tableware trapping basin carried thereby, are removed from the sink, the second inlet means is opened and the first inlet means is closed, whereby the lateral water discharge from the first inlet means is terminated and the tangential water discharge from the second inlet means is initiated to produce the swirling water flow hereinbefore discussed.

An important object of the invention is to provide said first inlet means with means for directing one or more jets of water across and into the tableware trapping basin below its discharge lip or edge and in a direction toward the discharge lip or edge so as to displace garbage in the basin toward said discharge lip, and to provide said first inlet means with means for directing one or more jets of water across the basin and approximately at the discharge lip thereof in a direction to displace garbage from the discharge lip into the sink. With this construction, the first jet or jets mentioned displace garbage from the basin toward the discharge lip of the basin, and the second jet or jets mentioned displace such garbage over the discharge lip into the sink for comminution by the disposer. Preferably, such jets are produced by differently oriented holes, or rows of holes, which form the first inlet means and which are formed in a fitting mounted on one side wall of the sink.

Another object of the invention is to provide a sink appliance wherein the minimum clearance between the discharge lip of the tableware trapping basin and the sink is at least substantially equal to the minimum clearance between the discharge lip and the cover so that any pieces of garbage which can pass over the discharge lip through the clearance between the discharge lip and the cover can freely pass through the clearance between the discharge lip and the sink into the garbage disposer beneath the sink. This clearance relationship is attained by locating the opening through the cover through which the garbage is introduced to one side of the center of the cover, another object of the invention being to provide a cover with such a laterally offset opening.

Another object is to provide an opening through the cover which is elongated and which is provided with a downwardly extending periphery to force the tableware to fall lengthwise into the trapping basin, thereby insuring trapping of any tableware passing through the opening in the cover.

Another object is to provide a sheet metal sink having at its lower end an outlet the periphery of which is turned outwardly to eliminate any obstructions to the passage of garbage, thereby insuring free passage of garbage through the outlet into the garbage disposer.

Another object is to provide a sink having a seat encompassing its outlet and to provide a tubular scrap block seated on such seat and having water inlets thereinto above the seat, the upper end of the scrap block being below the upper end of the sink so that dishes, trays, and the like can be passed over the sink freely without obstruction by the scrap block.

The foregoing objects, advantages and features of the present invention, together with other objects, advantages and features thereof which will become apparent, may be attained with the exemplary embodiments of the invention illustrated in the accompanying drawings and described in detail hereinafter. Referring to the drawings:

Fig. 1 is a sectional view of a sink appliance embodying the invention;

Fig. 2 is a plan view of the sink appliance;

Fig. 3 is an enlarged, fragmentary sectional view duplicating a portion of Fig. 1;

Fig. 4 is a view taken as indicated by the arrow 4 of Fig. 3;

Fig. 5 is a view taken as indicated by the arrow 5 of Fig. 4;

Fig. 6 is a sectional view taken along the arrowed line 6—6 of Fig. 4;

Fig. 7 is a sectional view similar to Fig. 1 but illustrating another embodiment of the invention; and Fig. 8 is a plan view of the sink appliance illustrated in Fig. 7.

Referring particularly to Figs. 1 and 2 of the drawings, the numeral 10 designates a restaurant dish table, or the like, on which dishes are rinsed to remove food remnants therefrom, although it will be understood that the present invention is not necessarily limited to use with such a dish table. The table 10 is provided with a hole 11 therein and disposed below and registering with this hole is a downwardly converging, generally conical, or, more particularly, frusto-conical basin or sink 12, the latter having a flange 13 which is seated against the underside of the table 10 and which is suitably secured thereto in a manner not specifically shown. Associated with the sink 12 is a cover 15 having an annular flange 16 adapted to fit into the hole 11 and to seat on the annular flange 13. The sink 12 is provided at its lower end with an outlet 17 which communicates with the inlet 18 of a garbage disposer 19 shown as bolted, or otherwise secured, to the lower end of the sink 12. In the particular construction illustrated, the sink 12 is formed of sheet metal (although some other material, such as plastic, could be used) and the lower end thereof, which forms the periphery of the outlet 17, is turned outwardly, as indicated at 20. With this construction, internal shoulders, or the like, within the outlet 17 which would tend to obstruct the passage of food waste or garbage are avoided, which is an important feature.

The cover 15 is provided with an opening 25 through which garbage to be handled by the disposer 19 may be introduced into the sink 12, a tableware trapping receptacle means or basin 26 being carried by the cover 15 below and aligned with the opening 25. In the particular construction illustrated, the basin 26 is provided with sides 27 which are suitably secured to the cover 15 to mount the basin 26 on the cover. The lowest point of the bottom of the basin 26 is below edges or lips 28 and 29 of the basin so that any tableware inadvertently dropped through the opening 25 will be retained by the basin, the lip 28 being a discharge lip over which garbage is discharged into the sink 12 in a manner to be described. The opening 25 is elongated and its length is substantially equal to the width of the basin 26 and the periphery of the opening 25 is provided with a downturned flange or lip 30.

The opening 25 and the basin 26 are offset laterally to one side of the center of the cover 15 so that the minimum clearance between the discharge lip 28 and the side wall of the sink 12, as indicated by the dimensional arrow 31, is at least substantially equal to, and preferably slightly greater than, the minimum clearance between the discharge lip and the cover 15, as indicated by the dimensional arrow 32. With this construction, any pieces of garbage which are capable of passing through the minimum clearance 32 may freely pass through the minimum clearance 31 into the garbage disposer 19, there being no danger of such pieces of garbage hanging up between the sink 12 and the basin 26, which is an important feature.

Mounted on one side of the sink 12 is a fitting or housing 35 which provides a first inlet means 36 adapted to direct water laterally of the sink 12 at the basin 26 and which provides a second inlet means 37 adapted to direct water tangentially of the sink 12 so that water discharged by the second inlet means swirls around the sink along an inwardly and downwardly spiralling path which leads to the outlet 17 so as to flush through the outlet any garbage adhering to the side walls of the sink. The two inlet means 36 and 37 are controlled in a manner to be described hereinafter.

As best shown in Figs. 3 and 4, the first inlet means 36 is shown as including a lower row of holes 38 which communicate with a manifold passage 39 in the fitting 35, and as including an upper row of holes 40 also communicating with the manifold passage 39. The lower holes 38 are so dimensioned and oriented that they produce jets of water directed across and into the basin 26 below the discharge lip 28 thereof and directed generally toward the discharge lip so that garbage in the basin is displaced hydraulically toward the discharge lip by such jets. The upper holes 40 are so dimensioned and oriented that they direct jets of water across the basin 26 approximately at, and preferably slightly above, the discharge lip 28 in a direction to hydraulically displace over the discharge lip and into the sink 12 any garbage which has been hydraulically displaced into the vicinity of the discharge lip by the jets from the lower holes 38. Thus, the generally horizontal jets from the holes 38 and 40 co-operate to hydraulically displace garbage from the basin 26 into the sink 12 so that such garbage is flushed through the outlet 17 into the garbage disposer 19, which is an important feature of the invention. It will be understood that while the jets produced by the holes 38 and 40 are capable of displacing garbage out of the basin 26, tableware trapped in the basin 26, being much more dense than the garbage, is not so displaced, being retained in the basin 26 until subsequently removed by the operator.

Referring to Figs. 3 to 6 of the drawings, water is supplied to the fitting 35 through a flanged fitting 45 onto which a suitable supply conduit, such as a pipe, not shown, may be threaded. The flanged fitting 45 is threaded onto a flanged fitting 46 which extends through a hole in the sink 12 into the fitting 35, the wall of the sink 12 being clamped between the fittings 45 and 46 and suitable gaskets being provided to provide a fluid-tight seal. The fitting 35 is shown as attached to the sink 12 by screws 47, although any other suitable means may be employed. The fitting 46 provides a seat 51 for an end of a hollow valve member 52 which is movable in a bore 53 in the fitting 35 and which forms part of a selector valve means for alternatively directing water from the fittings 45 and 46 to either the first inlet means 36 or the second inlet means 37. As will be apparent from Fig. 3 of the drawings, water from the fittings 45 and 46 can flow into the interior of the valve member 52 and, when the valve member is in its first position, shown in Fig. 3 of the drawings, the water can flow from the interior of the valve member through ports 54 into the manifold passage 39 which supplies the lower holes 38 and the upper holes 40 described previously, the valve member being seated on the seat 51 when in its first position.

As will be apparent, the water force in the interior of the valve member 52 tends to move the valve member toward a second position wherein it disengages the seat 51 and is seated against the upper end of the bore 53. The valve member 52 is provided at its upper end with an actuating stem 55 which projects through a hole 56 in the fitting 35 for a purpose to be described, the actuating stem being encircled by a gasket 57 which seats against the upper end of the bore 53 to prevent leakage around the stem when the valve member is in its second position.

When the valve member 52 is in its second position, the ports 54 are out of registry with the manifold passage 39 so that no water can reach the first inlet means 36. Under such conditions, water may flow from the fittings 45 and 46 between the lower end of the valve member 52 and the seat 51 into a passage 60 which, as best shown in Fig. 5, extends through the fitting 35 to the second or tangential inlet means 37 which produces the swirling flow hereinbefore described. Thus, when the valve member 52 is in its first position wherein it is seated on the seat 51, it delivers water to the first or lateral inlet means 36, and, when it is in its second position, it delivers water to the second or tangential inlet means 37, the valve member being hydraulically movable from its first position to its second position by the force of the water supply.

Considering the manner in which the valve member 52 is maintained in its first position in opposition to the hydraulic force biasing it toward its second position, the cover 15 is provided thereon with an actuating means having the form of an actuating button 61 adapted to engage the actuating stem 55 on the valve member 52 to hold the valve member in its first position when the cover is on the sink 12 in a predetermined position, i. e., when the cover is on the sink in a position such that the actuating button 61 engages the actuating stem 55. An indexing means for this position is provided, such indexing means comprising a projection 62 on the fitting 35 which is insertable into a hole 63 in the cover 15.

Thus, it will be apparent that, as long as the cover 15 is on the sink 12 in the proper position, i. e., in a position such that the actuating button 61 engages the actuating stem 55, the valve member 52 is in its first position to deliver water to the first inlet means 36, which hydraulically displaces garbage from the basin 26 in the manner hereinbefore described. When the cover 15 is removed from the sink 12, or is rotated into a position such that the actuating stem 55 is not engaged by the actuating button 61, the valve member automatically moves to its second position, under the influence of the force of the water supply, to cut off the delivery of water to the first inlet means and to initiate the delivery of water to the second inlet means 37, whereupon the swirling water flow hereinbefore described occurs to flush into the garbage disposer 19 any garbage which may be adhering to the sides of the sink 12. As will be apparent, the tangential inlet means 37 may be activated whenever desired and is automatically activated whenever the cover is removed to recover any tableware trapped in the basin 26, thereby flushing out any garbage in the sink.

Referring to Figs. 7 and 8 of the drawings, the cover 15 may be removed to permit the insertion into the sink 12 of a tubular scrap block 69. The latter is seated in a sleeve 70, the lower end of which is complementary to the sink 12 and is adapted to seat on the sink in an area encompassing the outlet 17. The sleeve 70 is provided with water inlet openings 71 just above the seat therefor provided by the sink 12 and the upper end of the scrap block 69 is below the upper end of the sink 12 so that dishes, trays, and the like may be passed over the sink without interference by the scrap block. It will be understood that when the scrap block 69 and sleeve 70 are substituted for the cover 15, the valve member 52 automatically assumes its second position to activate the tangential inlet means 37 so that, while the scrap block is in use, water is introduced into the sink 12 to flush out garbage with the swirling action hereinbefore described, which is an important feature. It will be understood that the scrap block 69 and sleeve 70 may be formed integrally if desired.

While we have disclosed exemplary embodiments of our invention herein for purposes of illustration, it will be understood that various changes, modifications and substitutions may be incorporated in such embodiments without necessarily departing from the spirit of the invention as defined by the claims which follow.

We claim as our invention:

1. In combination: a sink; a cover adapted to be removably positioned over said sink and having an opening therethrough providing manual access to said sink; receptacle means below said cover and aligned with said opening; first inlet means for supplying a liquid to said sink below said cover so as to direct the same into said receptacle; second inlet means for supplying a liquid to said sink below said cover so as to by-pass said receptacle; selector valve means movable between a first position wherein it opens said first inlet means and closes said second inlet means and a second position wherein it opens said second inlet means and closes said first inlet means; and actuating means for actuating said selector valve means.

2. In combination: a sink; a cover adapted to be removably positioned over said sink and having an opening therethrough providing manual access to said sink; receptacle means below said cover and aligned with said opening; first inlet means for supplying a liquid to said sink below said cover so as to direct the same into said receptacle; second inlet means for supplying a liquid to said sink below said cover so as to by-pass said receptacle; selector valve means movable between a first position wherein it opens said first inlet means and closes said second inlet means and a second position wherein it opens said second inlet means and closes said first inlet means; and actuating means operative when said cover is in a predetermined position over said sink for maintaining said selector valve means in said first position so as to maintain said first inlet means open and said second inlet means closed.

3. The combination defined in claim 2 wherein said actuating means is carried by said cover and is engageable with said selector valve means.

4. The combination defined in claim 2 including means for hydraulically biasing said seelctor valve means toward said second position.

5. In combination: a sink; a cover adapted to be removably positioned over said sink and having an opening therethrough providing manual access to said sink; receptacle means below said cover and aligned with said opening; inlet means for supplying a liquid to said sink below said cover; valve means controlling said inlet means; and actuating means on said cover for maintainig said valve means in a position to open said inlet means when said cover is in a predetermined position over said sink.

6. The combination defined in claim 5 including means for hydraulically biasing said valve means toward a position to close said inlet means.

7. In combination: a sink; a cover adapted to be removably positioned over said sink and having an opening therethrough providing manual access to said sink, said opening being offset to one side of the center of said cover; receptacle means below said cover and aligned with said opening; first inlet means for supplying a liquid to said sink below said cover so as to direct the same into said receptacle; second inlet means for supplying a liquid to said sink below said cover so as to by-pass said receptacle; and means associated with said cover and operative when said cover is in a predetermined position over said sink to render said first inlet means operative and said second inlet means inoperative to supply liquid to said sink.

8. In combination: a sink; a cover adapted to be removably positioned over said sink and having an opening therethrough providing manual access to said sink, said opening being offset to one side of the center of said cover; receptacle means below said cover and aligned with said opening; inlet means for supplying a liquid to said sink below said cover; and valve means on said sink and controlling said inlet means and operable by said cover for opening or closing said inlet means in response to movement of said cover.

9. In combination: a sink; a cover adapted to be removably positioned over said sink and having an opening therethrough providing manual access to said sink; receptacle means below said cover and aligned with said opening; said receptacle means having a discharge lip and the minimum clearance between said discharge lip and said sink being at least substantially equal to the minimum clearance between said discharge lip and said cover; first inlet means for supplying a liquid to said sink below said cover so as to direct the same into said receptacle; second inlet means for supplying a liquid to said sink below said cover so as to by-pass said receptacle; and means associated with said cover and operative when said cover is in a predetermined position over said sink to render said first inlet means operative and said second inlet means inoperative to supply liquid to said sink.

10. In combination: a sink; a cover adapted to be removably positioned over said sink and having an opening therethrough providing manual access to said sink; receptacle means below said cover and aligned with said opening, said receptacle means having a discharge lip and the minimum clearance between said discharge lip and said sink being at least substantially equal to the minimum clearance between said discharge lip and said cover; inlet means for supplying a liquid to said sink below said cover; and valve means on said sink and controlling said inlet means and operable by said cover for opening or closing said inlet means in response to movement of said cover.

11. In combination: a sink; a cover adapted to be removably positioned over said sink and having an opening therethrough providing manual access to said sink, said opening being elongated; receptacle means below said cover and aligned with said opening; first inlet means for supplying a liquid to said sink below said cover so as to direct the same into said receptacle; second inlet means for supplying a liquid to said sink below said cover so as to by-pass said receptacle; and means associated with said cover and operative when said cover is in a predetermined position over said link to render said first inlet means operative and said second inlet means inoperative to supply liquid to said sink.

12. In combination: a sink; a cover adapted to be removably positioned over said sink and having an opening therethrough providing manual access to said sink, said opening being elongated; receptacle means below said cover and aligned with said opening; inlet means for supplying a liquid to said sink below said cover; and valve means on said sink and controlling said inlet means and operable by said cover for opening or closing said inlet means in response to movement of said cover.

13. In combination: a sink; a cover adapted to be removably positioned over said sink and having an opening therethrough providing manual access to said sink; receptacle means below said cover and aligned with said opening, said receptacle means having a discharge lip; first inlet means for supplying a liquid to said sink below said cover so as to direct the same into said receptacle, said first inlet means including means for directing one or more jets of liquid approximately at said discharge lip and including means for directing one or more jets of liquid into said receptacle means below said discharge lip; second inlet means for supplying a liquid to said sink below said cover so as to by-pass said receptacle; and means associated with said cover and operative when said cover is in a predetermined position over said sink to render said first inlet means operative and said second inlet means inoperative to supply liquid to said sink.

14. In combination: a sink; a cover adapted to be removably positioned over said sink and having an opening therethrough providing manual access to said sink; receptacle means below said cover and aligned with said opening, said receptacle means having a discharge lip; inlet means for supplying a liquid to said sink below said cover, said inlet means including means for directing one or more jets of liquid approximately at said discharge lip and including means for directing one or more jets of liquid into said receptacle means below said discharge lip; and means controlling said inlet means and operable by said cover for opening or closing said inlet means in response to movement of said cover.

15. In combination: a sink; a tableware trapping basin in said sink, said basin having a discharge lip; and inlet means for water directed toward said basin and adapted to flush material therefrom into said sink, said inlet means including means for directing one or more jets of water across said basin and approximately at said discharge lip in a direction to displace material from said discharge lip outwardly into said sink, and said inlet means including means for directing one or more jets of water across and into said basin below said discharge lip and in a direction toward said discharge lip so as to displace material in said basin toward said discharge lip.

16. In combination: a sink; a tableware trapping basin in said sink; inlet means for water directed toward said basin and adapted to flush material therefrom into said sink; a manually removable cover for said sink seated thereon and having an opening therethrough above and in alignment with said basin, said opening being elongated, and locating means on said cover and said sink for positioning said cover relative to said sink upon placement of said cover on said sink.

17. In combination: a sink; a tableware trapping basin in said sink; inlet means for water directed toward said basin and adapted to flush material therefrom into said sink; a manually removable cover for said sink seated thereon and having an opening therethrough above and in alignment with said basin, said opening being laterally offset from the center of said cover, and locating means on said cover and said sink for positioning said cover relative to said sink upon placement of said cover on said sink.

18. In combination: a uniformly downwardly converging, sheet metal sink having at its lower end an outlet the periphery of which is turned outwardly to insure free passage of material through said outlet; a cover adapted to be removably positioned over said sink and having an opening therethrough providing manual access to said sink; receptacle means below said cover and aligned with said opening; inlet means for supplying a liquid to said sink below said cover; and valve means on said sink and controlling said inlet means and operable by said cover for opening or closing said inlet means in response to movement of said cover.

19. The combination defined in claim 1 wherein said sink is generally conical, wherein said first inlet means is located at one side of said sink and is directed laterally of said sink toward said receptacle means, and wherein said second inlet means is also located at one side of said sink and is directed tangentially of said sink to produce a swirling flow of liquid spiralling inwardly and downwardly toward the lower end of said sink.

20. In combination: a downwardly converging sink having an outlet at its lower end and a seat encompassing said outlet; tubular scrap block means seated on said seat and having water inlets thereinto above said seat, the upper end of said scrap block means being below the upper end of said sink; and an inlet means for water located at one side of said sink and directed tangentially of said sink to produce a swirling flow of water spiralling inwardly and downwardly toward the lower end of said sink.

21. In combination: a sink; a cover adapted to be removably positioned over said sink and having an opening therethrough providing manual access to said sink; receptacle means below said cover and aligned with said opening; first inlet means for supplying a liquid to said sink below said cover so as to direct the same into said receptacle; second inlet means for supplying a liquid to said sink below said cover so as to by-pass said receptacle; selector valve means movable between a first position wherein it opens said first inlet means and closes said second inlet means and a second position wherein it opens said second inlet means and closes said first inlet means; and actuating means operative when said cover is in a predetermined position over said sink for actuating said selector valve means.

22. In combination: a uniformly downwardly converging sink of sheet material having at its lower end an outlet the periphery of which is turned outwardly to insure free passage of material through said outlet; water inlet means at one side of said sink below the top thereof; and means controlling said water inlet means for opening and closing same.

23. In combination: a downwardly converging sink having an outlet at its lower end; tubular scrap block means extending upwardly from said lower end of said sink and having water inlets thereinto above said lower end of said sink; and an inlet means for water located at one side of said sink and communicating with the interior thereof.

24. The combination defined in claim 23 including valve means controlling said inlet means for opening and closing same.

25. In combination: a uniformly downwardly converging sink having an outlet at its lower end; water inlet means located at one side of said sink below the top thereof and communicating with the interior thereof; valve means carried by said sink and controlling said water inlet means for opening and closing same; and a cover for said sink having means thereon for operating said valve means.

26. The combination defined in claim 25 wherein the periphery of said outlet is turned outwardly to insure free passage of material through said outlet.

References Cited in the file of this patent

UNITED STATES PATENTS

| | | |
|---|---|---|
| 660,172 | Tarr | Oct. 23, 1900 |
| 850,076 | Thibert | Apr. 9, 1907 |
| 1,831,966 | Mason | Nov. 17, 1931 |
| 2,400,879 | Hilliker | May 28, 1946 |
| 2,573,965 | Guglielmoni | Nov. 6, 1951 |
| 2,583,997 | Chester | Jan. 29, 1952 |
| 2,593,359 | Strehlow et al. | Apr. 15, 1952 |
| 2,604,633 | McPherson | July 29, 1952 |
| 2,630,918 | Janows | Mar. 10, 1953 |